(12) United States Patent
Shirotori

(10) Patent No.: US 10,670,136 B2
(45) Date of Patent: Jun. 2, 2020

(54) BREATHER DEVICE FOR CASING STRUCTURE OF VEHICULAR POWER TRANSMITTING SYSTEM

(71) Applicant: TOYOTA JIDOSHA KABUSHIKI KAISHA, Toyota-shi, Aichi-ken (JP)

(72) Inventor: Kotaro Shirotori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/223,629

(22) Filed: Dec. 18, 2018

(65) Prior Publication Data

US 2019/0186615 A1    Jun. 20, 2019

(30) Foreign Application Priority Data

Dec. 18, 2017   (JP) .................................. 2017-242250

(51) Int. Cl.
*F16H 57/027*   (2012.01)
*F16H 57/04*   (2010.01)

(52) U.S. Cl.
CPC ........... *F16H 57/027* (2013.01); *F16H 57/04* (2013.01)

(58) Field of Classification Search
CPC .............................. F16H 57/027; F16H 57/04
See application file for complete search history.

(56) References Cited

U.S. PATENT DOCUMENTS 6,719,096 B2 *   4/2004   Mogi ................... F16H 57/027
                                                                    184/6.23

FOREIGN PATENT DOCUMENTS

| JP | 57094169 A | * | 6/1982 | ........... F16H 57/027 |
| JP | 11278073 A | * | 10/1999 | ........... F16H 57/027 |
| JP | 2016-028926 A |  | 3/2016 | |

* cited by examiner

*Primary Examiner* — Thomas C Diaz
(74) *Attorney, Agent, or Firm* — Oliff PLC

(57) ABSTRACT

A breather device for a casing structure of a vehicular power transmitting system including an electric motor and a transmission, the casing structure having motor and transmission accommodating casings, the breather device including first and second breather apertures formed in communication with inside spaces, and a breather outlet communicating with an outside atmosphere outside the casings, the first and second breather apertures permitting flows of air from the inside spaces within the casings, into the outside atmosphere through the breather outlet, to prevent an excessive rise of air pressures within the inside spaces, the breather device including a communication conduit for communication between the first and second breather apertures, and a single breather conduit held in communication at one of its opposite ends with the communication conduit and at the other end with the breather outlet, whereby the inside spaces are open to the outside atmosphere.

2 Claims, 5 Drawing Sheets

BREATHER DEVICE FOR CASING STRUCTURE OF VEHICULAR POWER TRANSMITTING SYSTEM

This application claims priority from Japanese Patent Application No. 2017-242250 filed on Dec. 18, 2017, the disclosure of which is herein incorporated by reference in its entirety.

FIELD OF THE INVENTION

The present invention relates to a breather device of a casing structure of a vehicular power transmitting system.

BACKGROUND OF THE INVENTION

There is known a breather device which is a ventilation device for air communication between an inside space within a casing of a transmission of a power transmitting system of a vehicle, and an outside atmosphere outside the casing, to prevent an excessive rise of an air pressure in the inside space. JP2016-28926A discloses an example of such a breather device. The power transmitting system disclosed in this publication includes an electric motor accommodated in a motor accommodating casing, as well as a transmission accommodated in a transmission accommodating casing. These motor accommodating casing and transmission accommodating casing are provided with respective breather devices to prevent excessive rises of air pressures within the motor and transmission accommodating casings.

Where the motor and transmission accommodating casings are provided with the respective breather devices independent of each other, as disclosed in JP2016-28962A, two air breather conduits in the form of breather pipes must be installed in communication with air breather outlets of the respective breather devices, while the electric motor and the transmission accommodated in the respective casing are mounted in position in an engine room of the vehicle, such that the air breather conduits do not interfere with other neighboring components. Accordingly, the power transmitting system has a low degree of freedom of arrangement of an air passage system of the breather devices, and suffers from a low degree of ease of mounting of the motor and transmission accommodating casings.

SUMMARY OF THE INVENTION

The present invention was made in view of the background art described above. It is therefore an object of the present invention to provide a breather device for a casing structure of a vehicular power transmitting system including an electric motor and a transmission, which breather device has two breather apertures formed in communication with inside spaces within respective motor accommodating casing and transmission accommodating casing respectively accommodating the electric motor and the transmission, and which breather device permits an improvement of a freedom of arrangement of an air passage system for communication of the two breather apertures with an outside atmosphere outside the casing structure of the vehicular power transmitting system installed on a vehicle.

The object indicated above is achieved according to the following modes of the present invention:

According to a first mode of the invention, there is provided a breather device for a casing structure of a vehicular power transmitting system including an electric motor and a transmission, the casing structure having a motor accommodating casing accommodating the electric motor, and a transmission accommodating casing accommodating the transmission, the breather device including: a first breather aperture formed in communication with an inside space within the motor accommodating casing; a second breather aperture formed in communication with an inside space within the transmission accommodating casing; and a breather outlet communicating with an outside atmosphere outside the motor and transmission accommodating casings, the first and second breather apertures permitting flows of air from the inside spaces within the motor and transmission accommodating casings, into the outside atmosphere through the breather outlet, to prevent an excessive rise of air pressures within the inside spaces, the breather device comprising: a communication conduit for communication between the first and second breather apertures; and a single breather conduit held in communication at one of its opposite ends with the communication conduit and at the other end with the breather outlet, whereby the inside spaces within the motor and transmission accommodating casings are open to the outside atmosphere through the first and second breather apertures, the communication conduit, the breather conduit and the breather outlet.

According to a second mode of the invention, the breather device according to the first mode of the invention further comprises: a hose joint connected to the first breather aperture; and a three-way joint including a first connecting portion, a second connecting portion and a third connecting portion. In this second mode of the invention, the first connecting portion is connected to the second breather aperture, and the communication conduit includes the hose joint, the three-way joint, and a connecting hose connecting the hose joint and the second connecting portion of the three-way joint, while the breather conduit includes a breather hose connecting the third connecting portion of the three-way joint and the breather outlet.

According to a third mode of the invention, the breather device according to the first mode of the invention further comprises: a hose joint connected to the second breather aperture; and a three-way joint including a first connecting portion, a second connecting portion and a third connecting portion. In this third mode of the invention, the first connecting portion is connected to the first breather aperture, and the communication conduit includes the hose joint, the three-way joint, and a connecting hose connecting the hose joint and the second connecting portion of the three-way joint, while the breather conduit includes a breather hose connecting the third connecting portion of the three-way joint and the breather outlet.

According to a fourth mode of the invention, the breather device according to the first mode of the invention is configured such that the communication conduit includes: a first hose joint connected to the first breather aperture; a second hose joint connected to the second breather aperture; and a connecting hose connecting the first and second hose joints to each other, while the breather conduit includes: a three-way joint which includes a first connecting portion, a second connecting portion and a third connecting portion, and which is connected at its first and second connecting portions to the connecting hose, so that the three-way joint is interposed in the connecting hose; and a breather hose connecting the third connecting portion of the three-way joint and the breather outlet to each other.

In the breather device according to the first mode of the invention, the first and second breather apertures are held in communication with each other through the communication conduit, and the single breather conduit is held in communication at one of its opposite ends with the communication conduit and at the other end with the breather outlet, whereby the inside spaces within the motor and transmission accommodating casings are open to the outside atmosphere through the first and second breather apertures, the communication conduit, the breather conduit and the breather outlet. Unlike the known breather device having two breather conduits for communication of respective first and second breather apertures with respective breather outlets so that the inside spaces within the motor and transmission accommodating casings are open to the outside atmosphere, the breather device according to the present invention employs the single breather conduit, so that the vehicular power transmitting system has a higher degree of freedom of arrangement of the air passage system of the breather device when the breather device is installed in an engine room.

In the breather device according to the second mode of the invention wherein the first connecting portion of the three-way joint is connected to the second breather aperture, the communication conduit need not include a hose connecting the three-way joint and the second breather aperture, so that the number of the required components of the communication conduit can be reduced.

In the breather device according to the third mode of the invention wherein the first connecting portion of the three-way joint is connected to the first breather aperture, the communication conduit need not include a hose connecting the three-way joint and the first breather aperture, so that the number of the required components of the communication conduit can be reduced.

In the breather device according to the fourth mode of the invention wherein the three-way joint is interposed in the connecting hose, the air flows out of the first and second breather apertures, into the outside atmosphere through the third connecting portion of the three-way joint and the single breather hose. Unlike the known breather device having two breather hoses for respective first and second breather apertures, the present breather device employs the single breather hose, so that the vehicular power transmitting system has a higher degree of freedom of arrangement of the air passage system of the breather device within an engine room of the vehicle.

DETAILED DESCRIPTION OF PREFERRED EMBODIMENTS

Preferred embodiments of the present invention will be described in detail by reference to the drawings. It is to be understood that the drawings showing the embodiments are simplified or transformed as needed, and do not necessarily accurately represent dimensions and shapes of various elements of the embodiments.

First Embodiment

Figure 1:
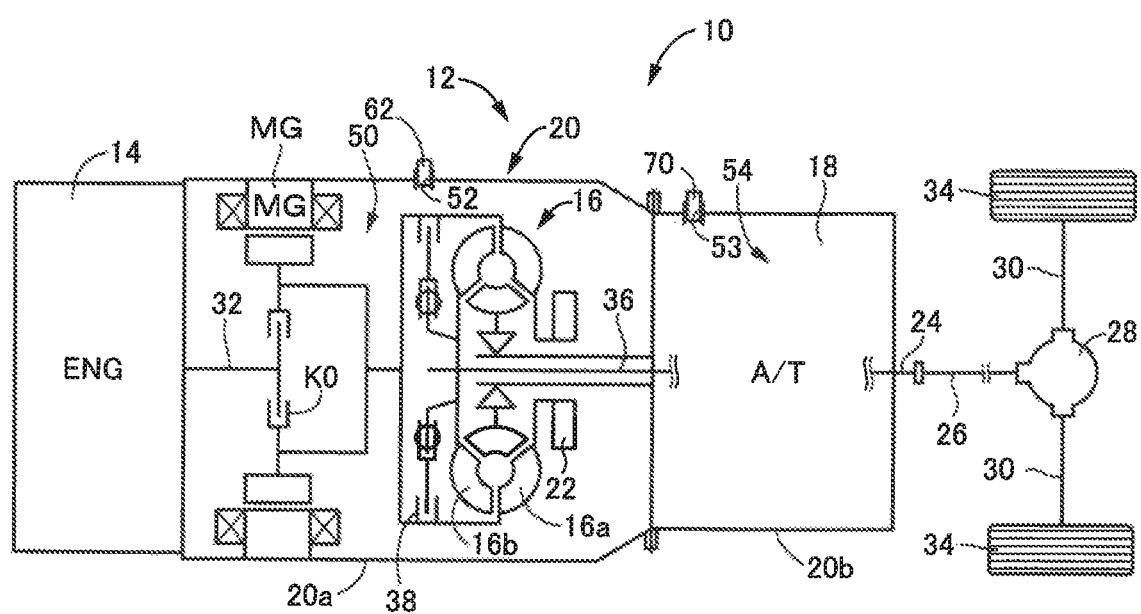
FIG. 1 is a schematic view showing an arrangement of a hybrid vehicle including a power transmitting system having a casing provided with a breather device according to one embodiment of the present invention.

Reference is first made to FIG. 1, which is the schematic view showing an arrangement of a hybrid vehicle 10 (hereinafter referred to simply as "vehicle 10") to which the present invention is applied. As shown in FIG. 1, the vehicle 10 includes a drive power source in the form of an engine 14, and a vehicular power transmitting system 12 (hereinafter referred to simply as "power transmitting system 12") for transmitting a drive force of the engine 14 to drive wheels 34.

The power transmitting system 12 includes: a engine connecting/disconnecting clutch K0; an electric motor MG; a torque converter 16; an oil pump 22; and an automatic transmission 18, which are accommodated within a stationary member in the form of a casing structure 20 fixed to a body of the vehicle 10 with bolts or any other fixing means. The power transmitting system 12 further includes: a propeller shaft 26 connected to an output rotary member in the form of an output shaft 24 of the automatic transmission 18; a differential gear device 28 connected to the propeller shaft 26; and a pair of right and left axles 30 operatively connected to the differential gear device 28 in a power transmittable manner.

The power transmitting system 12 constructed as described above is suitably used for the vehicle 10 of an FR type (front-engine rear-wheel drive type). In an engaged state of the engine connecting/disconnecting clutch K0, a drive force of the engine 14 is transmitted to the drive wheels 34 through the power transmitting system 12, namely, from a connecting shaft 32 connecting the engine 14 and the engine connecting/disconnecting clutch K0 to each other, to the drive wheels 34 through the engine connecting/disconnecting clutch K0, the torque converter 16, the automatic transmission 18, the propeller shaft 26, the differential gear device 28 and the axles 30, in this order of description.

The torque converter 16 is a fluid-operated power transmitting device configured to transmit a drive force through a working fluid, from a pump impeller 16a toward the automatic transmission 18. The pump impeller 16a is an input rotary element of the torque converter 16, which is connected to the engine 14 through the engine connecting/disconnecting clutch K0 and the connecting shaft 32, in this order of description. The pump impeller 16a is rotated with a rotary motion of the engine 14 transmitted thereto. The torque converter 16 further has an output rotary element in the form of a turbine impeller 16b which is connected, for instance, spline-connected to an input rotary element in the form of an input shaft 36 of the automatic transmission 18. The torque converter 16 is provided with a lockup clutch 38, which is a direct coupling clutch disposed between the pump impeller 16a and the turbine impeller 16b. The lockup clutch 38 is hydraulically controlled to be selectively placed in its engaged, slipping and released states.

The electric motor MG is interposed between the engine 14 and the automatic transmission 18. The electric motor MG is a so-called motor/generator having a function of an electric motor operable to convert an electric energy into a mechanical drive force, and a function of an electric generator operable to convert a mechanical energy into an electric energy. In other words, the electric motor MG can function as a vehicle drive power source operable in place of, or in addition to the engine 14, to generate a vehicle drive force. Further, the electric motor MG can function as an electric generator operable with a drive force generated by the engine 14, or a reverse drive force (mechanical energy) received from the drive wheels 34, to generate an electric energy which is stored in a battery or any other power storage device through an inverter or a voltage-raising converter (not shown).

The electric motor MG is connected to the pump impeller 16a such that a drive force is transmitted between the electric motor MG and the pump impeller 16a. Thus, like the engine 14, the electric motor MG is operatively connected through the torque converter 16 to the transmission input shaft 36 in a power transmittable manner. The electric motor MG is connected to the battery through the inverter or voltage-raising converter, such that the electric motor MG supplies or receives an electric energy to and from the battery. When the electric motor MG is operated as the vehicle drive power source, the engine connecting/disconnecting clutch K0 is placed in its released state, and the drive force generated by the electric motor MG is transmitted to the drive wheels 34 through the torque converter 16, the automatic transmission 18, the propeller shaft 26, the differential gear device 28 and the axles 30, in this order of description.

The casing structure 20 has a motor accommodating casing 20a accommodating the electric motor MG and the torque converter 16, and a transmission accommodating casing 20b accommodating the automatic transmission 18. The motor accommodating casing 20a defines a motor accommodating chamber 50 in which the electric motor MG and the torque converter 16 are disposed, and a transmission accommodating chamber 54 in which the automatic transmission 18 is disposed. These motor and transmission accommodating casings 20a and 20b are air-tightly separated from each other.

The motor accommodating casing 20a has a motor breather aperture 52 for communication between an inside space within the motor accommodating chamber 50 and an outside atmosphere outside the motor accommodating chamber 50. The motor breather aperture 52 is connected to a hose joint 62 described below. On the other hand, the transmission accommodating casing 20b has a transmission breather aperture 53 for communication between an inside space with the transmission accommodating chamber 54 and an outside atmosphere outside the transmission accommodating chamber 54. The transmission breather aperture 53 is connected to a three-way joint 70 described below. In the present embodiment, the motor breather aperture 52 is a first breather aperture of the present invention while the transmission breather aperture 53 is a second breather aperture of the present invention.

Figure 2:
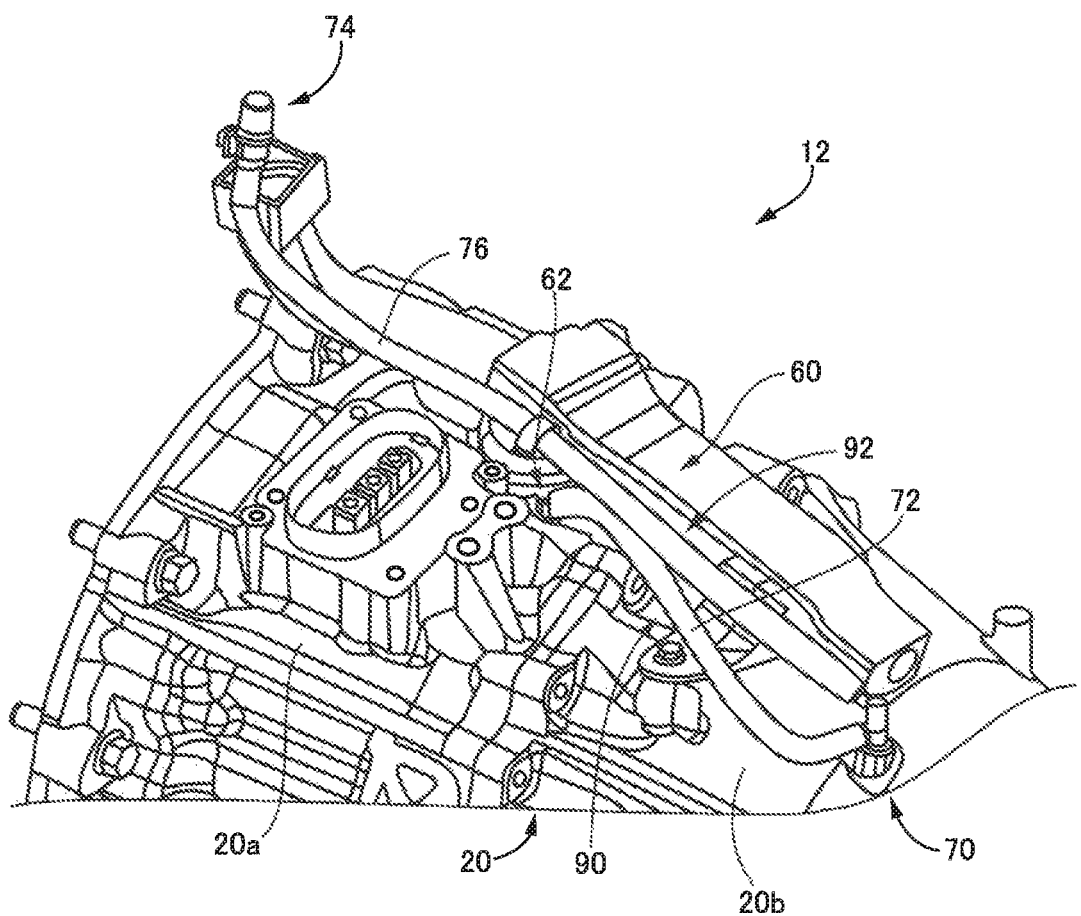
FIG. 2 is a perspective view showing a portion of the power transmitting system of FIG. 1, more specifically, an arrangement of the breather device provided in an upper portion of the casing of the power transmitting system installed in position on the hybrid vehicle.

FIG. 2 is the perspective view showing a portion of the power transmitting system 12 of FIG. 1, more specifically, an upper portion of the power transmitting system 12 installed in position on the vehicle 10. This upper portion of the power transmitting system 12 shown in FIG. 2 is accommodated within an engine room of the vehicle 10. It is noted that the engine 14 is located on the left side of the power transmitting system 12 as seen in FIG. 2.

The motor accommodating casing 20a and the transmission accommodating casing 20b of the casing structure 20 partially shown in FIG. 2 have cylindrical members which are bolted to each other and cooperate to constitute the casing structure 20.

The upper portion of the casing structure 20 as installed on the vehicle 10 is provided with a breather device 60 which is provided to permit flows of air from the motor accommodating chamber 50 and the transmission accommodating chamber 54 into the outside atmosphere, to prevent excessive rises of air pressures within the chambers 50 and 54.

The breather device 60 includes: the hose joint 62 connected to the motor breather aperture 52 formed through the motor accommodating casing 20a; the three-way joint 70 which has a first connecting portion 64 connected to the transmission breather aperture 53, a second connecting portion 66, and a third connecting portion 68; a connecting hose 72 connecting the hose joint 62 and the second connecting portion 66 of the three-way joint 70; and a breather hose 76 connecting the third connecting portion 68 of the three-way joint 70 and a breather plug 74. The connecting hose 72 and the breather hose 76 are formed of a resin or a rubber material.

The hose joint 62 is fitted in the motor breather aperture 52 (as shown in FIG. 1) formed for communication between the motor accommodating chamber 50 (formed within the motor accommodating casing 20a) and the outside atmosphere, so that the connecting hose 72 is connected to the motor breather aperture 52 through the hose joint 62.

Figure 3:
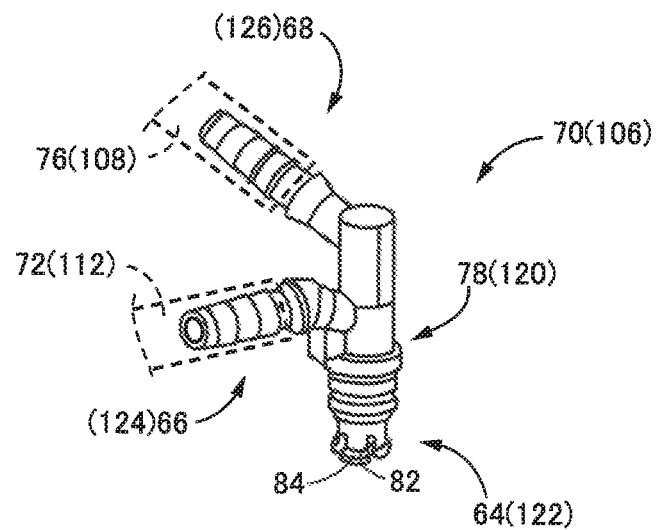
FIG. 3 is a schematic perspective view of a three-way joint of the breather device shown in FIG. 2.
Figure 4:
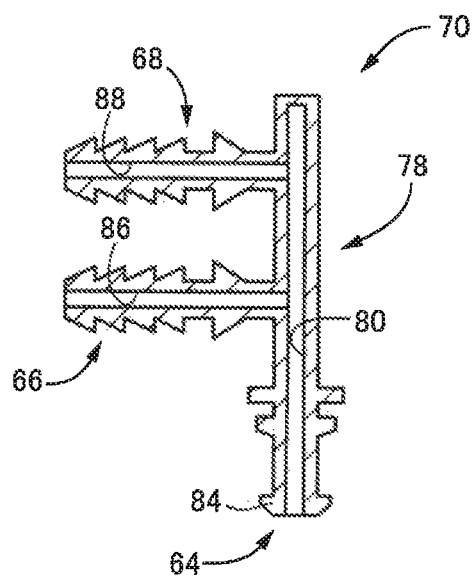
FIG. 4 is a schematic cross sectional view of the three-way joint shown in FIG. 3.

The three-way joint 70 is fitted in the transmission breather aperture 53 (as shown in FIG. 1) formed for communication between the transmission accommodating chamber 54 (formed within the transmission accommodating casing 20b) and the outside atmosphere. FIG. 3 is the schematic perspective view of the three-way joint 70, while FIG. 4 is the schematic cross sectional view of the three-way joint 70. It is noted that the second and third connecting portions 66 and 68 of the three-way joint 70 extend in different directions in respective different vertical planes, as Shown in FIG. 3, but these second and third connecting portions 66 and 68 are shown in FIG. 4 in the same plane, for convenience' sake.

The three-way joint 70 includes: an elongate main body 78; the above-indicated first connecting portion 64 which is formed at one end part of the main body 78; and the above-indicated second and third connecting portions 66 and 68 which extend from the main body 78 perpendicularly to a direction of extension of the main body 78. The main body 78 has a first air passage 80 formed therein such that the first air passage 80 extends in a longitudinal direction of the main body 78 to an upper end of the first connecting portion 64.

The first connecting portion 64 has a plurality of cutouts 82 formed at its lower end part so as to extend in the longitudinal direction of the main body 70, and a plurality of radially outwardly protruding jaws 84 between the adjacent cutouts 82. The cutouts 82 permit the jaws 84 of the first connecting portion 64 to be deformed for thereby permitting the jaws 84 to be pressed into the transmission breather aperture 53, whereby the first connecting portion 64 can be easily inserted into the transmission breather aperture 53. After the deformed jaws 84 have passed through the transmission breather aperture 53, the jaws 84 are restored to their original state or position, and brought into contact with an inner wall surface of the transmission accommodating casing 20b. Thus, the three-way joint 70 is fixedly attached at its first connecting portion 64 to the transmission accommodating casing 20b. In this state in which the first connecting portion 64 is fixed to the transmission accommodating casing 20b, an outer circumferential surface of the first connecting portion 64 is air-tightly held in contact with an inner circumferential surface of the transmission breather aperture 53. In this respect, an O-ring may be interposed between the outer circumferential surface of the first connecting portion 64 and the inner circumferential surface of the transmission breather aperture 53.

The second connecting portion 66 has a screwed outer circumferential surface, and a second air passage 86 formed therethrough in communication with the first air passage 80. The third connecting portion 68 has a screwed outer circumferential surface, and a third air passage 88 formed therethrough in communication with the first air passage 80. Thus, the first, second and third air passages 80, 86 and 88 are held in communication with each other, and flows of air through the first and second air passages 80 and 86 of the first and second connecting portions 64 and 66 into the three-way joint 70 can be directed into the third air passage 88 of the third connecting portion 68.

The hose joint 62 and the second connecting portion 66 of the three-way joint 70 are connected to each other through the connecting hose 72. Namely, the connecting hose 72 is connected at one of its opposite ends to the hose joint 62, and at the other end to the second connecting portion 66 of the three-way joint 70. Further, the third connecting portion 68 of the three-way joint 70 and the breather plug 74 are connected to each other through the breather hose 76. Namely, the breather hose 76 is connected at one of its opposite ends to the third connecting portion 68 of the three-way joint 70, and at the other end to the breather plug 74. It is noted that the breather plug 74 is provided at a breather outlet of the breather device 60, which is located at the above-indicated other end of the breather hose 76. The breather device 60 is a well known ventilating device which permits flows of air from the inside spaces within the motor accommodating casing 20a and the transmission accommodating casing 20b into the outside atmosphere outside the casing structure 20, through the breather hose 76 and the breather plug 74. The breather plug 74 is a member known in the art, a structure and an operation of which will not be described herein. The breather outlet indicated above is an opening of the above-indicated other end of the breather hose 76, which opening is located within the breather plug 74.

In the breather device 60, the hose joint 62, the three-way joint 70, and the connecting hose 72 connecting the hose joint 62 and the second connecting portion 66 of the three-way joint 70 cooperate to constitute a communication conduit 90 connecting the motor breather aperture 52 and the transmission breather aperture 53 to each other. Further, the breather hose 76 connecting the third connecting portion 68 of the three-way joint 70 and the breather plug 74 serves as a breather conduit 92 which is held in communication with the communication conduit 90 and through which the inside spaces within the motor and transmission accommodating casings 20a and 20b are open to the outside atmosphere outside the casing structure 20.

In the breather device 60 constructed as described above, the air flows from the motor accommodating casing 20a into the first air passage 80 of the three-way joint 70 through the hose joint 62, the connecting hose 72 functioning as a breather chamber, and the second air passage 86 of the second connecting portion 66 of the three-way joint 70. On the other hand, the air flows from the transmission accommodating casing 20b into the first air passage 80 through the first connecting portion 64 of the three-way joint 70. Thus, the air flows from the motor accommodating casing 20a and the transmission accommodating casing 20b merge with each other within the three-way joint 70. Further, the air flows from the first air passage 80 of the three-way joint 70 into the outside atmosphere through the third air passage 88 of the third connecting portion 68, the breather hose 76 and the breather outlet within the breather plug 74.

As described above, the hose joint 62 and the second connecting portion 66 of the three-way joint 70 are connected to each other through the connecting hose 72, and the flows of air from the motor accommodating casing 20a and the transmission accommodating casing 20b merge with each other within the three-way joint 70. Further, the third connecting portion 68 of the three-way joint 70 and the breather plug 74 are connected to each other through the breather hose 76, so that the air which has flown from the casings 20a and 20b into the three-way joint 70 flows from the breather outlet of the breather plug 74 into the outside atmosphere through the single breather hose 76. Thus, the present breather device 60 requires the single breather hose 76 connected to the breather plug 74, unlike the known breather device wherein a motor breather aperture and a transmission breather aperture are connected to a breather plug through respective two breather hoses. Accordingly, the present breather device 60 has a simplified air passage system leading to the breather plug 74, and has a higher degree of freedom of arrangement of the air passage system as installed on the vehicle 10.

Further, the first connecting portion 64 of the three-way joint 70 is fixed directly to the transmission accommodating casing 20b, so that the breather device 60 need not have a connecting hose for connecting the three-way joint 70 and the transmission accommodating casing 20b, whereby the number of required components of the breather device 60 can be reduced.

The breather device 60 according to the present embodiment of the invention described above is configured such that the motor breather aperture 52 (first breather aperture) and the transmission breather aperture 53 (second breather aperture) are held in communication with each other through the communication conduit 90, and the single breather conduit 92 is held in communication at one of its opposite ends with the communication conduit 90 and at the other end with the breather plug 74 (breather outlet), whereby the inside spaces within the motor and transmission accommodating casings 20a and 20b are open to the outside atmosphere through the motor and transmission breather apertures 52 and 53, the communication conduit 90, the single breather conduit 92 (breather hose 76) and the breather plug 74. Unlike the known breather device having two mutually independent breather conduits for communication of respective the motor breather aperture and transmission breather aperture with respective breather outlets so that the inside spaces within the motor and transmission accommodating casings are open to the outside atmosphere, the present breather device 60 employs the breather hose, so that the vehicular power transmitting system 12 has a higher degree of freedom of arrangement of the air passage system of the breather device 60 within an engine room of the vehicle 10.

The present embodiment is further configured such that the first connecting portion 64 of the three-way joint 70 is connected to the transmission breather aperture 53, so that the communication conduit 90 need not include a hose connecting the three-way joint 70 and the transmission breather aperture 53, whereby the number of the required components of the communication conduit 90 can be reduced.

Other embodiments of this invention will be described. It is to be understood that the same reference signs as used in the first embodiment will be used in the following embodiments, to identify the corresponding elements, which will not be described redundantly.

Second Embodiment

Figure 5:
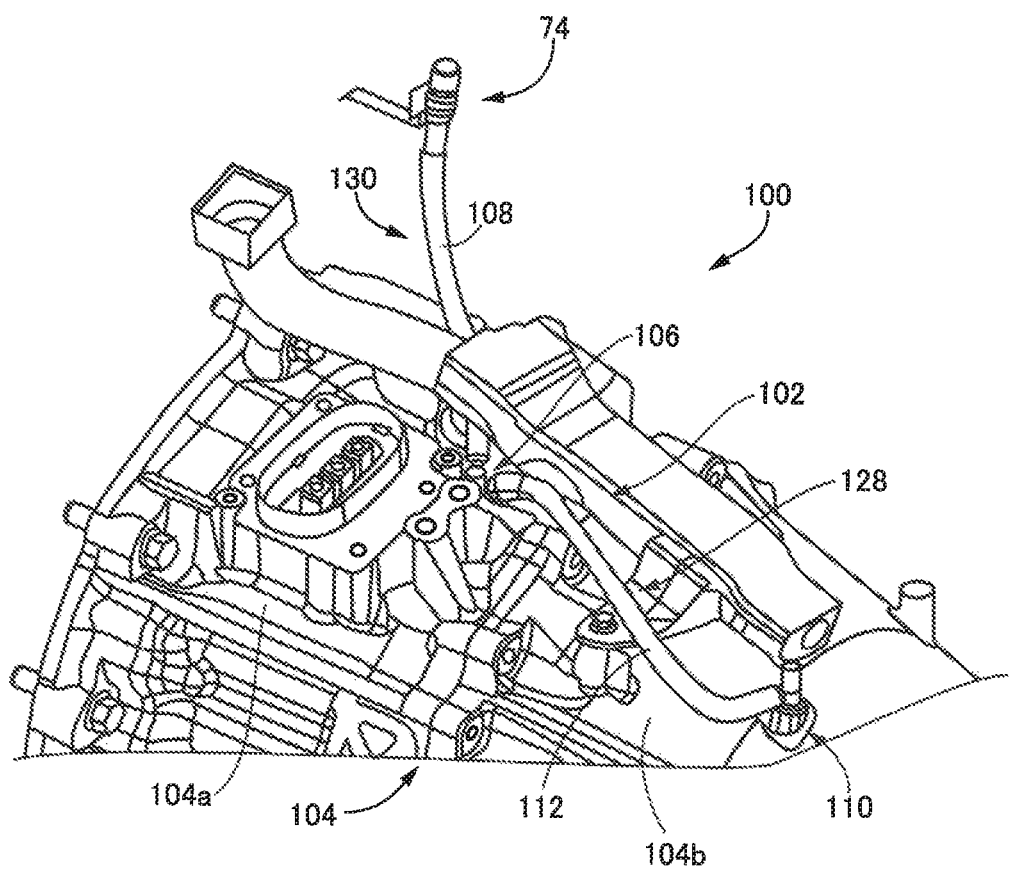
FIG. 5 is a perspective view of a portion of a vehicular power transmitting system according to another embodiment of this invention.

FIG. 5 is the perspective view of a vehicular power transmitting system 100 (hereinafter referred to simply as "power transmitting system 100") according to a second embodiment of this invention, corresponding to that of FIG. 2 showing the first embodiment. As shown in FIG. 5, the power transmitting system 100 includes a casing structure 104 having a cylindrical motor accommodating casing 104a accommodating the electric motor MG, and a cylindrical transmission accommodating casing 104b accommodating the automatic transmission 18. In the present second embodiment, the motor accommodating casing 104a is provided with a three-way joint 106 within which air flows from the motor accommodating casing 104a and the transmission accommodating casing 104b merge with each other. The power transmitting system 100 is provided with a breather device 102 constructed as described below.

In the casing structure 104, the motor and transmission accommodating casings 104a and 104b are air-tightly separated from each other by a partition wall not shown.

An upper portion of the casing structure 104 as installed on the vehicle 10 is provided with the breather device 102. The breather device 102 includes: the three-way joint 106 which has a first connecting portion 122 (indicated in parenthesis in FIG. 3), a second connecting portion 124 (indicated in parenthesis in FIG. 3), and a third connecting portion 126 (indicated in parenthesis in FIG. 3); a hose joint 110 connected to the transmission breather aperture 53 (shown in FIG. 1); and a connecting hose 112 connecting the hose joint 110 and the second connecting portion 124 of the three-way joint 106; and a breather hose 108 connecting the third connecting portion 126 and the breather plug 74. In the present embodiment, the motor breather aperture 52 is the first breather aperture of the present invention, while the transmission breather aperture 53 is the second breather aperture of the present invention.

The hose joint 110 is fitted in the transmission breather aperture 53 of the transmission accommodating casing 104b, which is connected to a connecting hose 112.

The three-way joint 106 has the same structure as the three-way joint 70 in the first embodiment. Described more specifically, the three-way joint 106 includes: an elongate main body 120 (indicated in parenthesis in FIG. 3); the above-indicated first connecting portion 122 which is formed at one end part of the main body 120; and the above-indicated second and third connecting portions 124 and 126 which extend from the main body 120 perpendicularly to a direction of extension of the main body 120. The three-way joint 106 has the same internal structure as the three-way joint 70 in the first embodiment, which will not be redundantly described.

The first connecting portion 122 of the three-way joint 106 is connected to the motor breather aperture 52 (shown in FIG. 1). The hose joint 110 and the second connecting portion 124 of the three-way joint 106 are connected to each other through the connecting hose 112. That is, the connecting hose 112 is connected at one of its opposite ends to the hose joint 110, and at the other end to the second connecting portion 124 of the three-way joint 106. Further, the third connecting portion 126 of the three-way joint 106 and the breather plug 74 is connected to each other through the breather hose 108. Namely, the breather hose 108 is connected at one of its opposite ends to the third connecting portion 126 of the three-way joint 106, and at the other end to the breather plug 74 provided at the breather outlet.

In the breather device 102, the hose joint 110, the three-way joint 106, and the connecting hose 112 connecting the hose joint 110 and the second connecting portion 124 of the three-way joint 106 cooperate to constitute a communication conduit 128 connecting the motor breather aperture 52 and the transmission breather aperture 53 to each other. Further, the breather hose 108 connecting the third connecting portion 126 of the three-way joint 106 and the breather plug 74 serves as a breather conduit 130 which is held in communication with the communication conduit 128 and through which inside spaces within the motor and transmission accommodating casings 104a and 104b are open through the breather outlet to an outside atmosphere outside the casing structure 104.

In the breather device 102 constructed as described above, the air flows from the transmission accommodating casing 104b into the three-way joint 106 through the hose joint 110, the connecting hose 112 functioning as a breather chamber, and the second connecting portion 124 of the three-way joint 106. On the other hand, the air flows from the motor accommodating casing 104a into the three-way joint 106 through the first connecting portion 122. Thus, the air flows from the motor accommodating casing 104a and the transmission accommodating casing 104b merge with each other within the three-way joint 106. Further, the air flows from the three-way joint 106 into the outside atmosphere through the third connecting portion 126, the breather hose 108 and the breather outlet within the breather plug 74.

As described above, the hose joint 110 and the second connecting portion 124 of the three-way joint 106 are connected to each other through the connecting hose 112, and the flows of air from the motor accommodating casing 104a and the transmission accommodating casing 104b merge with each other within the three-way joint 106. Further, the third connecting portion 126 of the three-way joint 106 and the breather plug 74 are connected to each other through the breather hose 108, so that the air which has flown from the casings 104a and 104b into the three-way joint 106 flows from the breather outlet of the breather plug 74 into the outside atmosphere through the single breather hose 108. Thus, the present breather device 102 requires the single breather hose 108 connected to the breather plug 74, unlike the known breather device wherein a motor breather aperture and a transmission breather aperture are connected to a breather plug through respective two breather hoses. Accordingly, the present breather device 102 has a simplified air passage system leading to the breather plug 74, and has a higher degree of freedom of arrangement of the air passage system as installed on the vehicle 10.

Further, the first connecting portion 122 of the three-way joint 106 is fixed directly to the motor accommodating casing 104a, so that the breather device 102 need not have a connecting hose for connecting three-way joint 106 and the motor accommodating casing 104a, whereby the number of required components of the breather device 102 can be reduced.

As described above, the present second embodiment described above has substantially the same advantages as the first embodiment described above. Further, since the first connecting portion 122 of the three-way joint 106 is fixed directly to the motor breather aperture 52, the communication conduit 128 need not have a connecting hose for connecting the three-way joint 106 and the motor breather aperture 52, so that the number of required components of the communication conduit 128 can be reduced.

Third Embodiment

Figure 6:
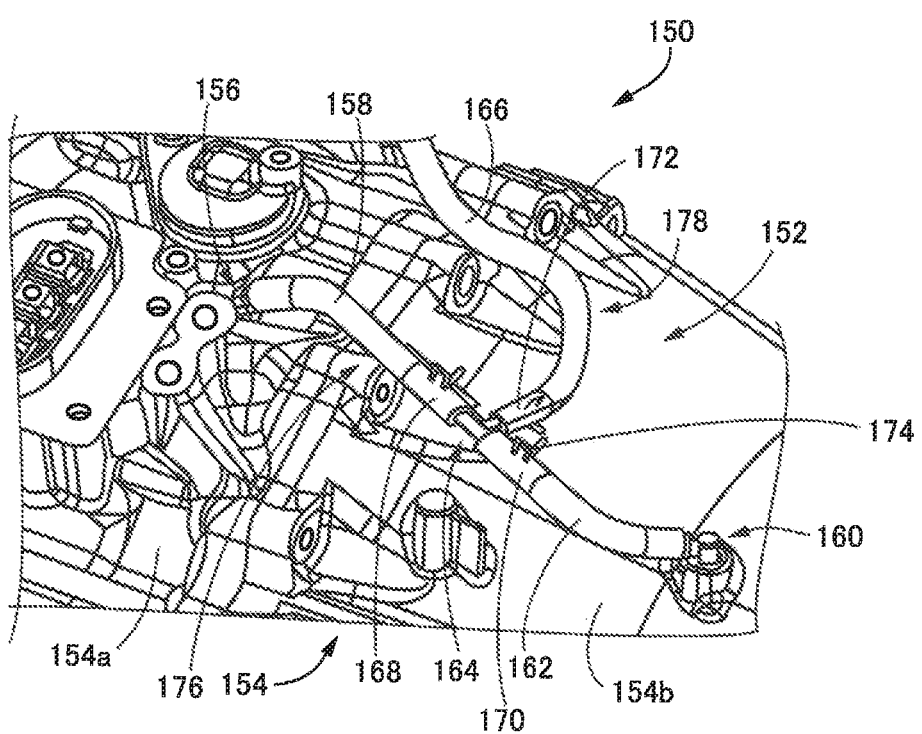
FIG. 6 is a perspective view of a portion of a vehicular power transmitting system according to a further embodiment of the invention.

FIG. 6 is the perspective view of a vehicular power transmitting system 150 (hereinafter referred to simply as "power transmitting system 150") including a casing structure 154 provided with a breather device 152. In the present breather device 152, a three-way joint 164 is connected to the motor breather aperture 52 and the transmission breather aperture 53, through respective connecting hoses. A structure of the breather device 152 will be described.

As shown in FIG. 6, the casing structure 154 of the power transmitting system 150 includes a cylindrical motor accommodating casing 154a accommodating the electric motor MG, and a cylindrical transmission accommodating casing 154b accommodating the automatic transmission 18. The breather device 152 is mounted on an upper portion of the casing structure 154 installed in position on the vehicle 10.

The breather device 152 includes: a first hose joint 156 connected to the motor breather aperture 52 (shown in FIG. 1) formed through the motor accommodating casing 154a; a second hose joint 160 connected to the transmission breather aperture 53 (shown in FIG. 1) formed through the transmission accommodating casing 154b; a first connecting hose 158 connected to the first hose joint 156; a second connecting hose 162 connected to the second hose joint 160; the three-way joint 164 which has three connecting portions and which is interposed between and held in communication with the first and second connecting hoses 158 and 162; and a breather hose 166 connecting the three-way joint 164 and the breather plug (not shown in FIG. 6) to each other. It is noted that the first and second connecting hoses 158 and 162 serve as a connecting hose of the present invention connecting the first and second hose joints 156 and 160.

The first hose joint 156 is connected to the motor breather aperture 52 (shown in FIG. 1) of the motor accommodating casing 154a, so that the first connecting hose 158 is connected at one of its opposite ends to the motor breather aperture 52 through the first hose joint 156. Similarly, the second hose joint 160 is connected to the transmission breather aperture 53 (shown in FIG. 1) of the transmission accommodating casing 154b, so that the second connecting hose 162 is connected at one of its opposite ends to the transmission breather aperture 53 through the second hose joint 160.

The three-way joint 164 is a well known Tee-type hose joint having three connecting portions. Namely, the three-way joint 164 has a first connecting portion 168, a second connecting portion 170 and a third connecting portion 172, which have respective air passages formed therethrough in communication with each other. The first connecting portion 168 is connected to the other end of the first connecting hose 158, and the second connecting portion 170 is connected to the other end of the second connecting hose 162, while the third connecting portion 172 is connected to the breather hose 166, which connects the three-way joint 164 and the breather plug. The three connecting portions 168, 170 and 172 are connected to the respective hoses 158, 162 and 166, with hose connector clips 174.

In the breather device 152 constructed as described above, a communication conduit 176 for communication between the motor breather aperture 52 and the transmission breather aperture 53 is constituted by: the first hose joint 156 connected to the motor breather aperture 52; the second hose joint 160 connected to the transmission breather aperture 53; and the first connecting hose 158 and the second connecting hose 162 which connect the first hose joint 156 and the second hose joint 160 to each other. Further, a single breather conduit 178 which is connected to the communication conduit 176 and through which inside spaces within the motor and transmission accommodating casings 154a and 154b are open to the outside atmosphere through the breather outlet of the breather plug is constituted by the three-way joint 164 interposed between the first and second connecting hoses 158 and 162, and the breather hose 166 connecting the third connecting portion 172 of the three-way joint 164 and the breather plug to each other.

In the breather device 152 constructed as described above, the air flows from the motor accommodating casing 154a into the three-way joint 164 through the first hose joint 156, and the first connecting hose 158 functioning as a breather chamber. On the other hand, the air flows from the transmission accommodating casing 154b into the three-way joint 164 through the second hose joint 160, and the second connecting hose 162 functioning as a breather chamber. Thus, the air flows from the motor accommodating casing 154a and the transmission accommodating casing 154b merge with each other within the three-way joint 164. Further, the air flows from the three-way joint 164 into the outside atmosphere through the third connecting portion 172, the breather hose 166 and the breather plug.

As described above, the first connecting hose 158 one end of which is connected to the motor breather aperture 52, and the second connecting hose 162 one end of which is connected to the transmission breather aperture 53 are connected at their other ends to the three-way joint 164, so that the air flows through the first connecting hose 158 and the second connecting hose 162 merge with each other within the three-way joint 164. Further, the third connecting portion 172 of the three-way joint 164 is connected to the breather plug through the single breather hose 166. Thus, the present breather device 152 requires the single breather hose 166 connected to the breather plug, unlike the known breather device wherein a motor breather aperture and a transmission breather aperture are connected to a breather plug through respective two breather hoses. Accordingly, the present breather device 152 has a simplified air passage system leading to the breather plug, and has a higher degree of freedom of arrangement of the air passage system as installed on the vehicle 10.

The present third embodiment described above has substantially the same advantages as the first and second embodiments described above. That is, the three-way joint 164 is interposed between the first and second connecting hoses 158 and 162, so that the air flows out of the motor breather aperture 52 and the transmission breather aperture 53, into the outside atmosphere through the third connecting portion 172 of the three-way joint 164 and the single breather hose 166. Unlike the known breather device having two breather hoses for respective first and second breather apertures, the present breather device 152 employs the single breather hose 166, so that the vehicular power transmitting system 150 has a higher degree of freedom of arrangement of the air passage system of the breather device 152 within an engine room of the vehicle 10.

While the preferred embodiments of the invention have been described in detail by reference to the drawings, it is to be understood that the invention may be otherwise embodied.

In the illustrated embodiments, the breather device 60, 102, 152 of the invention is applied to the casing structure 20, 104, 154 including the motor accommodating casing 20a, 104a, 154a accommodates the electric motor MG, and the transmission accommodating casing 20b, 104b, 154b accommodates the automatic transmission 18. However, the principle of the present invention is applicable to a breather device for any other casing structure as long as the casing structure includes a plurality of mutually independent casings wherein air pressures may be raised.

In the illustrated first and second embodiments, the three-way joint 70, 106 is fixed at its jaws 84 in the transmission breather aperture 53 formed through the casing 20b, 104b, or the motor breather aperture 52 formed through the casing 20a, 104a. However, the three-way joint may be fixed to the casing 20a, 20b, 104a, 104b, with any other fixing means. For instance, the three-way joint may have an externally threaded first connecting portion.

In the illustrated third embodiment, the three-way joint 164 is a Tee-type hose joint. However, the three-way joint may be any other type of hose joint having three connecting portions.

In the illustrated embodiments, the motor accommodating casing 20a, 104a, 154a accommodates the electric motor MG and the torque converter 16. However, the torque converter 16 may be accommodated within a casing separate from the motor accommodating casing.

In the illustrated embodiments, the communication conduits 90, 128 and 176 and the breather conduits 92, 130 and 178 are hoses formed of a resin or rubber material. However, those conduits may be metallic tubes, for example.

In the illustrated embodiments, the breather plug 74 is provided at one end of the breather hose corresponding to the breather outlet. However, the breather plug may be eliminated. In this case, the breather hose is open to the outside atmosphere at its above-indicated end.

While the preferred embodiments and modifications have been described for illustrative purpose only, it is to be understood that the present invention may be embodied with various other changes and improvements, which may occur to those skilled in the art.

NOMENCLATURE OF ELEMENTS

10: hybrid vehicle (vehicle)
20a, 104a, 154a: motor accommodating casing
20b, 104b, 154b: transmission accommodating casing
52: motor breather aperture (first breather aperture)
53: transmission breather aperture (second breather aperture)
60, 102, 152: breather device
64, 122, 168: first connecting portion
66, 124, 170: second connecting portion
68, 126, 172: third connecting portion
70, 106, 164: three-way joint
72, 112: connecting hose
74: breather plug
76, 108, 166: breather hose
90, 128, 176: communication conduit
92, 130, 178: breather conduit
158: first connecting hose (connecting hose)
162: second connecting hose (connecting hose)

What is claimed is:

1. A breather device for a casing structure of a vehicular power transmitting system including an electric motor and a transmission, the casing structure having a motor accommodating casing accommodating the electric motor, and a transmission accommodating casing accommodating the transmission, the breather device including: a first breather aperture formed in communication with an inside space within the motor accommodating casing; a second breather aperture formed in communication with an inside space within the transmission accommodating casing; and a breather outlet communicating with an outside atmosphere outside the motor and transmission accommodating casings, the first and second breather apertures permitting flows of air from the inside spaces within the motor and transmission accommodating casings, into the outside atmosphere through the breather outlet, to prevent an excessive rise of air pressures within the inside spaces, the breather device comprising:
   a communication conduit for communication between the first and second breather apertures;
   a single breather conduit held in communication at one of its opposite ends with the communication conduit and at the other end with the breather outlet, whereby the inside spaces within the motor and transmission accommodating casings are open to the outside atmosphere through the first and second breather apertures, the communication conduit, the breather conduit and the breather outlet;
   a hose joint connected to the first breather aperture; and
   a three-way joint including a first connecting portion, a second connecting portion and a third connecting portion,
   wherein the first connecting portion is directly connected to the second breather aperture, and the communication conduit includes the hose joint, the three-way joint, and a connecting hose connecting the hose joint and the second connecting portion of the three-way joint,
   wherein the breather conduit includes a breather hose connecting the third connecting portion of the three-way joint and the breather outlet, and
   wherein the first connecting portion of the three-way joint includes a plurality of cutouts formed at an end part of the first connecting portion, the plurality of cutouts each formed so as to extend in a longitudinal direction of a main body of the three-way joint, and a radially outwardly protruding jaw is provided between adjacent ones of the plurality of cutouts.

2. A breather device for a casing structure of a vehicular power transmitting system including an electric motor and a transmission, the casing structure having a motor accommodating casing accommodating the electric motor, and a transmission accommodating casing accommodating the transmission, the breather device including: a first breather aperture formed in communication with an inside space within the motor accommodating casing; a second breather aperture formed in communication with an inside space within the transmission accommodating casing; and a breather outlet communicating with an outside atmosphere outside the motor and transmission accommodating casings, the first and second breather apertures permitting flows of air from the inside spaces within the motor and transmission accommodating casings, into the outside atmosphere through the breather outlet, to prevent an excessive rise of air pressures within the inside spaces, the breather device comprising:
   a communication conduit for communication between the first and second breather apertures;
   a single breather conduit held in communication at one of its opposite ends with the communication conduit and at the other end with the breather outlet, whereby the inside spaces within the motor and transmission accommodating casings are open to the outside atmosphere through the first and second breather apertures, the communication conduit, the breather conduit and the breather outlet
   a hose joint connected to the second breather aperture; and
   a three-way joint including a first connecting portion, a second connecting portion and a third connecting portion, wherein the first connecting portion is directly connected to the first breather aperture, and the communication conduit includes the hose joint, the three-way joint, and a connecting hose connecting the hose joint and the second connecting portion of the three-way joint, wherein the breather conduit includes a breather hose connecting the third connecting portion of the three-way joint and the breather outlet, and wherein the first connecting portion of the three-way joint includes a plurality of cutouts formed at an end part of the first connecting portion, the plurality of cutouts each formed so as to extend in a longitudinal direction of a main body of the three-way joint, and a radially outwardly protruding jaw is provided between adjacent ones of the plurality of cutouts.

* * * * *